Aug. 17, 1954  P. P. NEWCOMB  2,686,401
FUEL MANIFOLD FOR GAS TURBINE POWER PLANTS
Filed Aug. 2, 1950  4 Sheets-Sheet 1

INVENTOR
PHILIP P. NEWCOMB
BY Charles A. Warren
ATTORNEY

Aug. 17, 1954   P. P. NEWCOMB   2,686,401
FUEL MANIFOLD FOR GAS TURBINE POWER PLANTS
Filed Aug. 2, 1950   4 Sheets-Sheet 2

INVENTOR
PHILIP P. NEWCOMB
BY Charles A. Warren
ATTORNEY

Aug. 17, 1954  P. P. NEWCOMB  2,686,401
FUEL MANIFOLD FOR GAS TURBINE POWER PLANTS
Filed Aug. 2, 1950  4 Sheets-Sheet 3
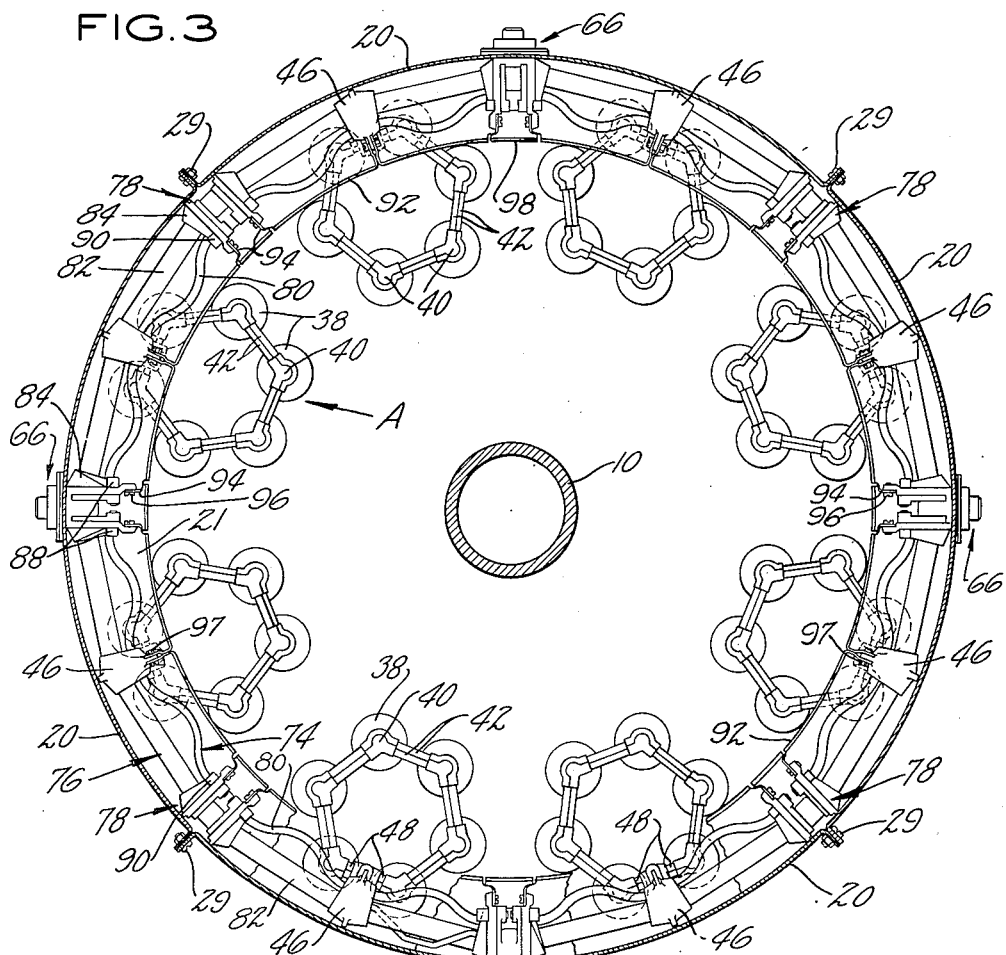
FIG. 3
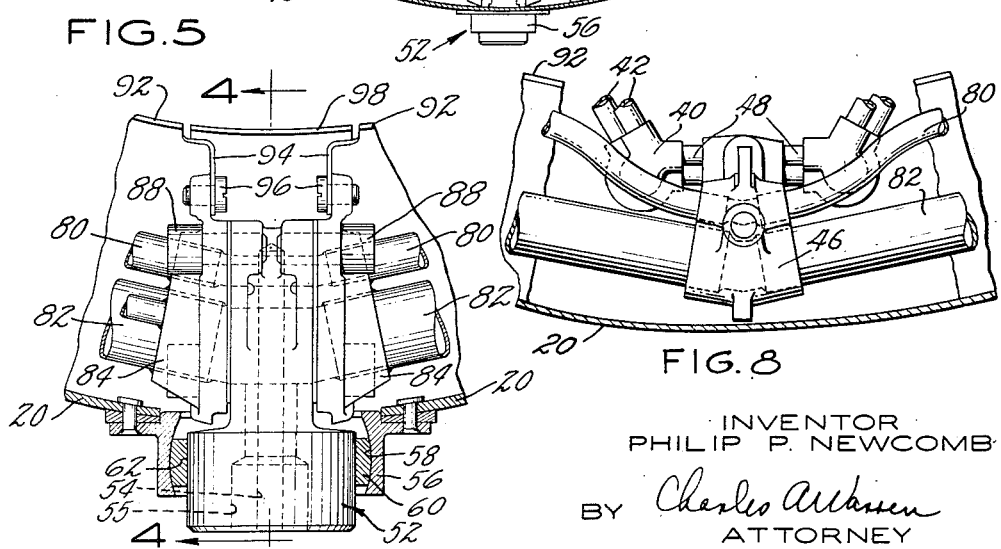
FIG. 5
FIG. 8
INVENTOR
PHILIP P. NEWCOMB
BY Charles Allhusen
ATTORNEY Aug. 17, 1954  P. P. NEWCOMB  2,686,401
FUEL MANIFOLD FOR GAS TURBINE POWER PLANTS
Filed Aug. 2, 1950  4 Sheets-Sheet 4

INVENTOR
PHILIP P. NEWCOMB
BY Charles A. Warren
ATTORNEY

UNITED STATES PATENT OFFICE 2,686,401

FUEL MANIFOLD FOR GAS TURBINE POWER PLANTS

Philip P. Newcomb, Manchester, Conn., assignor to United Aircraft Corporation, East Hartford, Conn., a corporation of Delaware Application August 2, 1950, Serial No. 177,298

19 Claims. (Cl. 60—39.31)

This invention relates to a fuel manifold arrangement for a gas turbine power plant.

The combustion chamber or chambers of gas turbine power plants adapted for aircraft are generally arranged in a ring around the shaft which extends between and provides a driving connection between the compressor and the turbine. The combustion chamber may be either in the form of a single annular chamber concentric to the shaft or a series of combustion chambers spaced angularly about the shaft. In either event, fuel is injected into the chambers through a series of nozzle which are arranged around the axis of the power plant and are generally connected by a manifold to a single supply. Whether the manifold has been located outside or inside the load carrying casing structure of the power plant the differential expansion resulting from the heat developing during the operation of the power plant tends to distort the manifold and to cause leaks at the joints. A feature of this invention is the support of the manifold in such a way as to minimize any distortion that might result from the expansion of the supporting casing at a different rate from that of the manifold.

When the manifold is outside of the casing the maximum transverse dimension of the power plant is generally increased by reason of the projection of the manifold and its connections. It is desirable in the modern high speed aircraft to reduce to a minimum the necessary frontal area of the power plant in order to enclose it within a thin wing or fuselage. Another feature is the enclosure of the manifold within the power plant in such a way that it will not be distorted by relative expansion of the parts.

One feature of the invention is the support of the nozzles from the manifold in order that a fuel system may be generally free to expand or contract independently of the adjacent parts of the power plant.

Other objects and advantages will be apparent from the specification and claims, and from the accompanying drawings which illustrate an embodiment of the invention.

Fig. 3 is a transverse sectional view approximately on line 3—3 of Fig. 1 with certain parts broken away and others omitted.

Fig. 5 is an enlarged view in elevation of the supporting bracket incorporating the fuel inlet, parts being broken away.

Fig. 8 is a view similar to Fig. 5, showing one of the nozzle carrying brackets.

Figure 1:
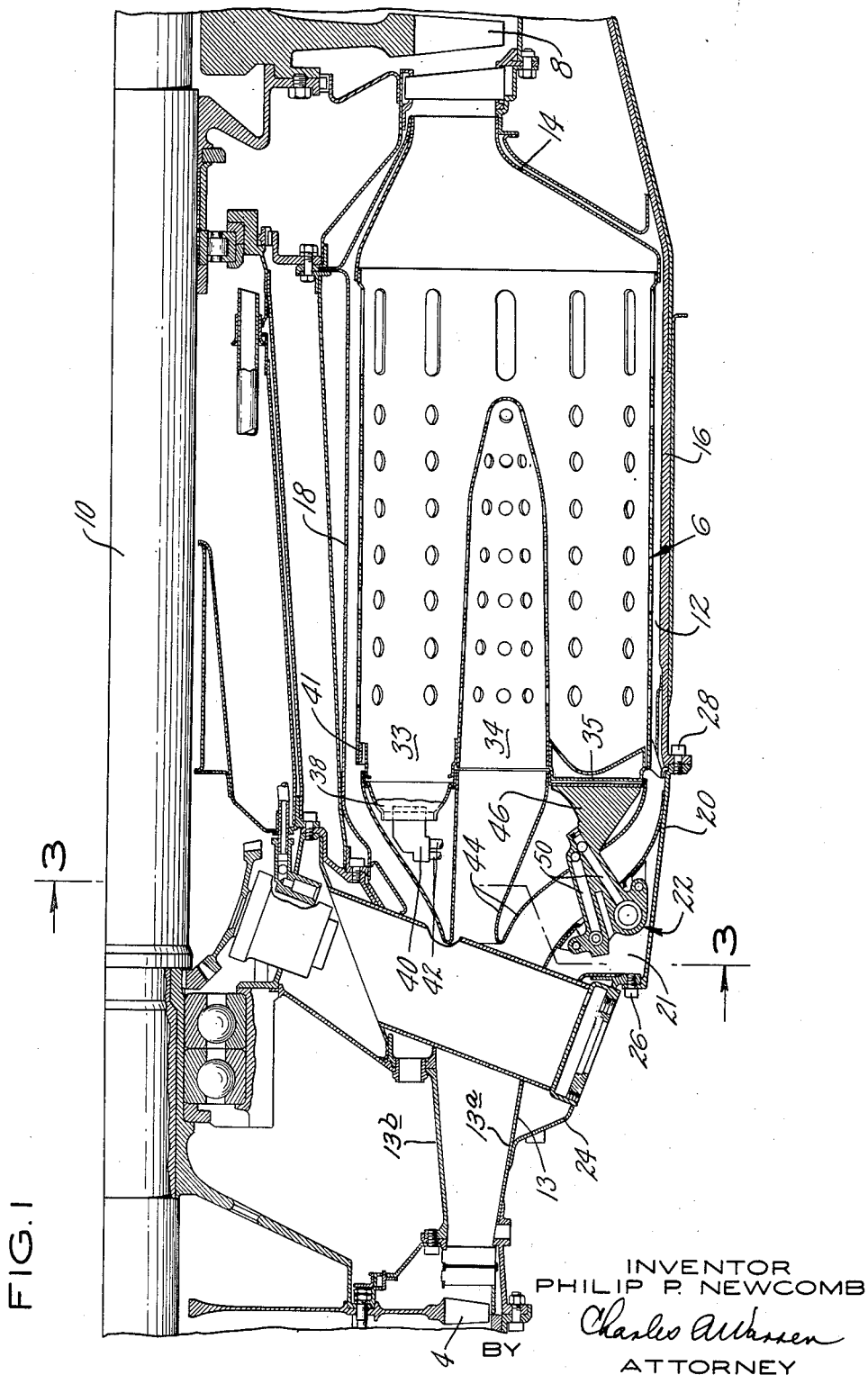
Fig. 1 is a partial longitudinal section of a gas turbine power plant with parts broken away to show the arrangement of the fuel manifold.

The invention is shown in a gas turbine power plant in which air compressed by an axial flow compressor 4 is delivered to the combustion chambers 6 where fuel is added to the air. The fuel is burned in the compressed air for increasing the energy content before it is discharged through the turbine 8, the latter being connected to the compressor by a shaft 10. From the turbine the gas is discharged through a thrust nozzle not shown.

In the arrangement shown, the combustion chambers 6 are in the form of several independent cans located in angularly spaced relation within an annular duct 12 concentric to the axis of shaft 10. The air is distributed from the compressor discharge through a diffuser 13 to the duct 12. The hot gas discharging from the combustion chambers is directed to the annular turbine inlet through a manifold 14. The annular duct 12 enclosing the combustion chambers has a cylindrical outer wall 16 which surrounds the combustion chambers and is concentric to the shaft, an inner substantially parallel wall 18 forms the inner guiding wall for the flow of air around the outside of the individual combustion chambers. The walls 16 and 18 are extensions of the outer and inner walls 13a and 13b respectively of the diffuser 13. The wall 16 may constitute the cylindrical load-carrying casing for the burner section of the power plant.

Forwardly of the upstream end of cylindrical case 16, the power plant has a load-carrying ring or casing 20 which is spaced from the outer wall of diffuser 13 to provide an annular chamber or passage 21 for the location of the manifold 22 later described in detail. The ring 20 which is split into several segments (four in the arrangement shown, see Fig. 3) is connected to the upstream end of the diffuser by another supporting ring 24. The downstream end of ring 24 is removably secured to the ring 20 as by a row of bolts 26 and the downstream end of the ring 20 is removably secured as by bolts 28 to the cylindrical case 16. The flanged ends of the segments of the ring 20 are held as by bolts 29, Fig. 3, to provide for removal of any segment separately.

Each combustion chamber 6 (Fig. 2) is in effect spaced inner and outer tubes 30 and 32 which define between them an annular combustion space 33 with a central air inlet passage 34. The upstream ends of the tubes 30 and 32 are held in spaced relation by suitable bracing strips 35. Portions of the bracing strips extend forward from the tubes 30 and 32 to engage with a cap 36 which closes the inlet end of the space 33. The cap 36 has a number of openings to receive nozzles supporting cups 38 in which the individual nozzles 40 are positioned. The bracing strips 35 are obviously located between adjacent cups 38 so as not to interfere with the fuel flow from the nozzles into the space 33. The bracing may be spaced from the outer wall 32 by a wiggle strip 41 which will allow the admission of air at this point into the space 33.

The nozzles 40 for each combustion chamber and the interconnecting pipes 42 extending between them are shielded by a fairing 44 which guides the flow of air from the compressor into the space surrounding the outer tube 32 and also into the space 34 inside of the inner tube 30. The combustion chamber structure so far disclosed is in general similar to that described in the copending Brown application Serial No. 151,507, filed March 23, 1950, now Patent No. 2,676,460, and is not in itself a part of this invention.

Figure 2:
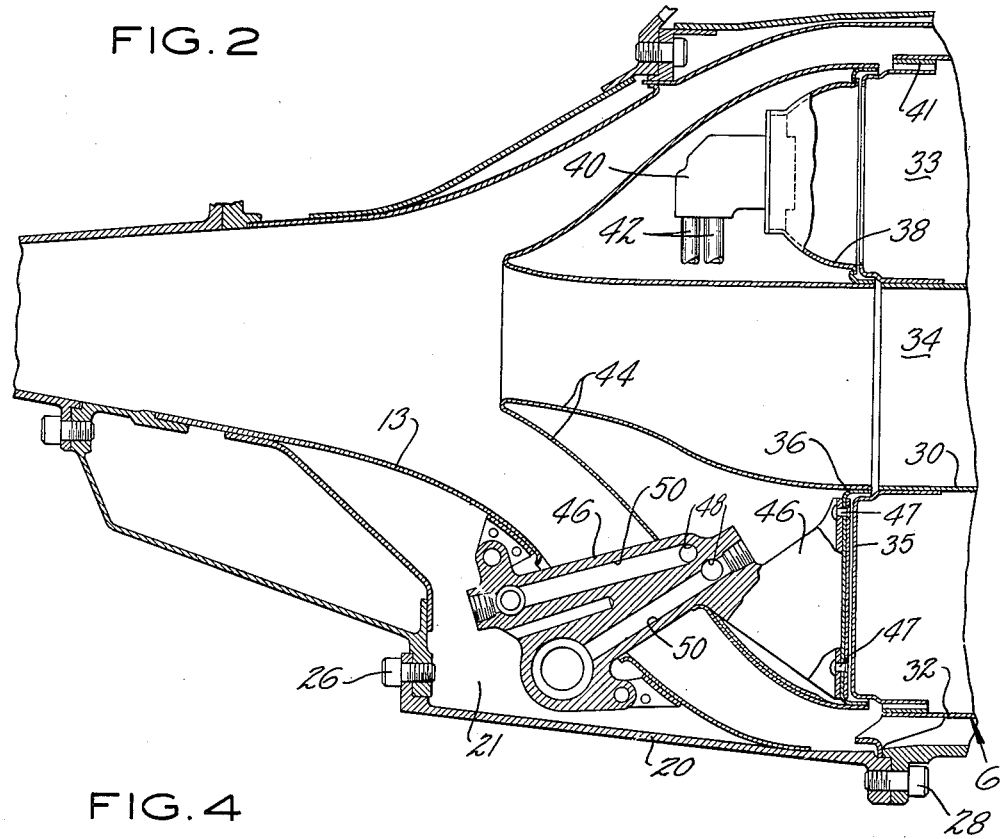
Fig. 2 is a fragmentary sectional view on a larger scale showing the inlet end of one of the combustion chambers and the arrangement for supplying fuel thereto.

Each of the combustion chambers 6 has a number of the fuel nozzles 40, there being six in the arrangement shown, and these six nozzles are interconnected as best shown in Fig. 3 by the short connecting fuel pipes 42 to form an assembly of nozzles and supply pipes which can be positioned as a unit on the end of the combustion chamber. The assembly of nozzles for each of the combustion chambers is supported by a bracket 46 (Figs. 2 and 3) which is mounted on the cap 36 as by rivets 47 between adjacent nozzle cups 38. The bracket 46 is located between adjacent nozzles 40 of the ring of nozzles and the fuel tubes 48, Fig. 3, extending laterally from the bracket to the adjacent nozzles function to support the nozzles in predetermined relation to each other and to the bracket. Other tubes 42 interconnect the remaining nozzles 40 of each set and function to support the set of nozzles as an integral assembly on the bracket 46. The cap 36 and the bracket 46 are also held together such that the cap is a part of the assembly, and the fairing 44 is then secured to the cap to form an additional part of the assembly. The tubes 48 connect with supply passages 50 in the bracket as shown in Fig. 2 with the part of the bracket in which the passages 50 are located extending outwardly into the space 21 between the ring 20 and the adjacent wall of the diffuser section 13.

Figure 4:
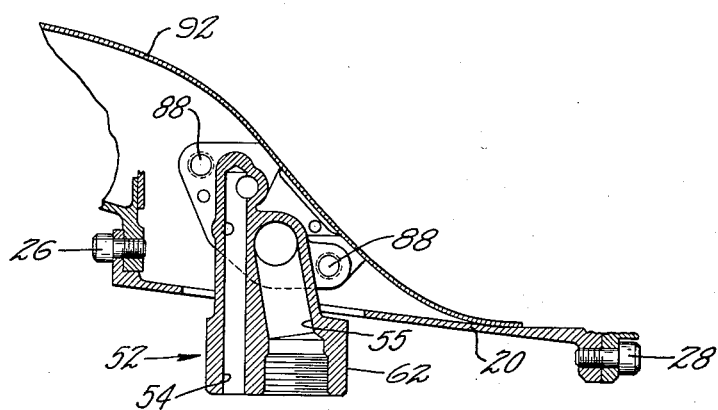
Fig. 4 is a transverse sectional view substantially along line 4—4 of Fig. 5.

Referring now to Fig. 3, fuel is supplied to all of the nozzle assemblies for the several combustion chambers from a single fuel inlet connection or bracket 52 which has a pair of fuel inlet ducts 54 and 55, Figs. 4 and 5, extending therethrough. The fuel inlet connection is supported by the ring 20, this ring having a projecting hollow boss 56 providing a spherical surface 58 with a substantially radial axis to receive a guide ring 60. The inner surface of the guide ring 60 receives a cylindrical part 62 of the bracket 52. With this arrangement the bracket 52 is free to move radially with respect to the supporting ring 20 and to twist with respect to the spherical seating surface 58 for a purpose which will more fully appear later.

Figure 6:
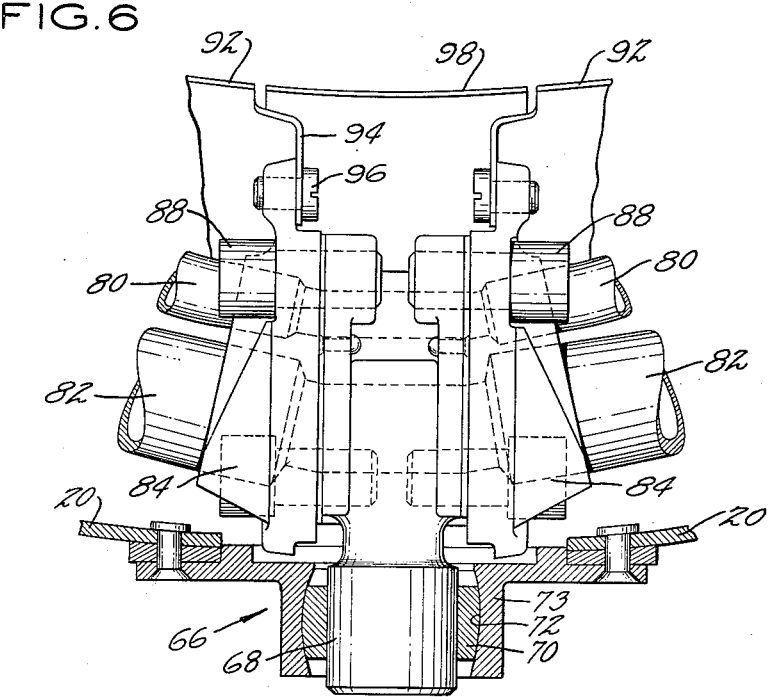
Fig. 6 is a view similar to Fig. 5, showing one of the other supporting brackets.
Figure 7:
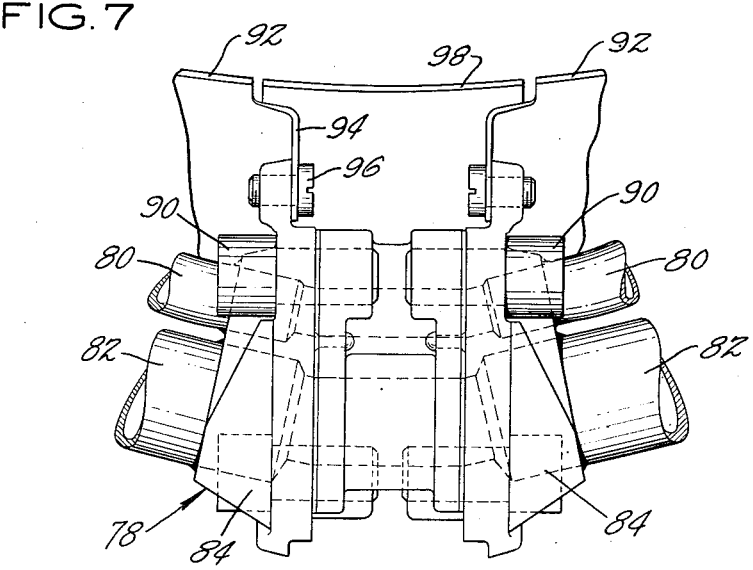
Fig. 7 is a view similar to Fig. 5, showing one of the connecting brackets.

This bracket 52 and a number of other brackets 66 (there being three others in the arrangement shown at 90° apart), function to support the entire fuel manifold within the ring 20. Each of the other supporting brackets 66 is similar to bracket 52 except that there is no fuel inlet thereto. Each bracket 66, Fig. 6, has a radially extending cylindrical portion 68 similar to the portion 62 fitting within a spherical-surfaced ring 70, the latter being received in a cooperating spherical seating surface 72 in a boss 73 provided by the ring 20. Since the bracket 52 incorporates the fuel inlet, the other brackets 66 merely provide circumferentially extending passages therein for the flow of fuel therethrough.

From the fuel inlet bracket 52 fuel is directed by a pair of ducts 74 and 76 extending circumferentially around the engine in the passage 21, to the adjacent nozzle supporting brackets 46 from which fuel reaches the individual nozzles in the sub-assembly of the group of nozzles. Fuel is also passed circumferentially through the nozzle supporting bracket 46 and by continuations of ducts 74 and 76 to connecting brackets 78 located midway between adjacent supporting brackets 52 and 66. Circumferential passages in these connecting brackets 78 deliver fuel to further continuations of ducts 74 and 76 to the adjacent nozzle carrying brackets 46 and thence within the space 21 around the engine to all of the nozzle carrying brackets 46. Obviously ducts 74 and 76 are made up of intercommunicating passages in the brackets and tubes 80 and 82 interconnecting the passages in adjacent brackets. The interconnecting tube portions of the ducts 74, which is the smaller diameter duct, may be curved to accommodate differential expansion between the ducts.

The complete fuel manifold is thus supported at angularly spaced points by the engagement of brackets 52 and 66 with ring 20 in such a manner that the entire manifold may expand or contract radially with respect to the ring 20 through the sliding action of the cylindrical portions of these brackets within the supporting spherical rings. The supporting brackets 52 and 66, in the particular arrangement shown are 90° apart by reason of the selection of eight combustion chambers and the brackets 78 are located midway between the supporting brackets in such a way that each nozzle assembly is located between a supporting bracket and a connecting bracket 78.

By the particular arrangement shown it is possible to remove from position or to mount in position any one of the nozzle assemblies without disturbing the remaining assemblies. To accomplish this the portions of the ducts 74 and 76 which are in the form of short pipes are an integral part of each nozzle assembly. Since the assemblies are substantially similar, the arrangement for the nozzle assembly A will be described. As shown in Fig. 3, the nozzle carrying bracket 46 has a small diameter pipe 80 extending laterally therefrom in each direction and a large diameter pipe 82 similarly arranged, these pipes forming a part of the ducts 74 and 76, respectively, and being brazed or otherwise secured in the bracket 46. The outer ends of the pipes 80 and 82 are similarly secured in mounting plates 84, each nozzle assembly therefore including two mounting plates 84 one on each side of the assembly. One of the plates 84 is secured as by bolts 88 to the supporting bracket 66 and the other mounting plate is similarly secured as by bolts 90 to the adjacent connecting bracket 78.

In the removal of any one of the nozzle assemblies, for example the nozzle assembly A in Fig. 3, the overlying segment of the ring 20 is removed by undoing the bolts 29 and also the other retaining bolts 26 and 28, Fig. 1. This segment may then be withdrawn from the power plant, the spherical ring which fits over the supporting brackets 52 or 66 being readily withdrawn therefrom. The plates 84 are then accessible so that the bolts 88 and 90 may be removed to disengage these plates from the brackets to which they are fastened. The nozzle assembly is then readily withdrawn from the power plant by twisting it forwardly to disengage the cap 36 from the bracing strips 35. Each nozzle assembly, as has been pointed out above, includes the six individual nozzles 40, the associated bracket 46 and two mounting plates 84, one on the outer ends of each of the short pipes projecting from the sides of bracket 46. With the removal of the nozzle assembly, segments 92 of the outer wall 13a of the diffuser 13 are removed therewith, these segments extending between adjacent brackets as shown, and having outwardly projecting tabs 94 at each end by which these segments may be attached as by bolts 96 to the plates 84 and by bolts 97 to the bracket 46. It will be noted that the heads of the bolts 96 are so located that they will not interfere with the removal of the nozzle assembly and the length of the segment of the diffuser wall is also less than the arcuate dimension of the nozzle assembly. Removal of any of the other assemblies is accomplished in the same manner, it being obvious that the brackets 52 and 66 will remain in position when any one of the nozzle assemblies is withdrawn.

Since the ends of adjacent diffuser wall segments 92 are spaced apart when the device is assembled, each of the brackets 52, 66 and 78 carries on its inner surface a small supplementary segment 98 of the diffuser wall, this segment being attached in any suitable manner, as for example by brazing or welding. It is obviously not essential that the joints between the segments 92 and 98 be air-tight since the surrounding space 21 is closed and leakage past the segmental pieces will occur only until the pressure in space 21 is built up to the pressure within the diffuser.

It is to be understood that the invention is not limited to the specific embodiment herein illustrated and described, but may be used in other ways without departure from its spirit as defined by the following claims.

I claim:

1. In a fuel supply system for a gas turbine power plant having an annular casing, the system including a fuel manifold in the form of a ring positioned concentrically of said casing, and angularly spaced supporting means for said manifold having radial sliding movement in the casing to provide for relative expansion between the casing and the manifold, said supporting means including brackets forming part of said manifold, said manifold having mounted thereon, between the brackets, fuel nozzles to which the manifold supplies fuel.

2. In a fuel supply system for a gas turbine power plant having a casing, and an annular path within said casing for the flow of gas through said power plant, the system including a fuel manifold in the form of a ring positioned concentrically of said casing, angularly spaced supporting brackets forming a part of said manifold, said brackets having means thereon arranged for sliding movement with respect to the casing to provide for relative expansion between the casing and the manifold, and nozzle means connected to said manifold between the brackets and located in said path for discharging fuel from the manifold.

3. In a fuel supply system for a gas turbine power plant having a casing, and an annular path within said casing for the flow of gas through said power plant, the system including a fuel manifold in the form of a ring positioned within said casing and externally of the gas path, angularly spaced, supporting brackets forming a part of said manifold and having means thereon arranged for radial sliding movement with respect to said casing to provide for relative expansion between the casing and the manifold, and a number of angularly spaced nozzles located in said path and connected to said manifold between the brackets for discharging fuel.

4. In a fuel supply system for a gas turbine power plant having an annular casing, the system including a fuel manifold in the form of a ring positioned concentrically of said casing, and interfitting elements on the casing and manifold at angularly spaced points around the manifold, one of said interfitting elements being radially slidable relative to the other to support the manifold concentrically of the casing, but leaving the manifold free to expand and contract radially relative to the casing, said manifold including spaced brackets carrying the interfitting elements common to the manifold.

5. In a fuel supply system for a gas turbine power plant having a casing, the system including a fuel manifold in the form of a ring positioned within said casing, interfitting elements on the casing and manifold at angularly spaced points around the manifold, one of said interfitting elements being radially slidable relative to the other to support the manifold concentrically of the casing, leaving the manifold free to expand and contract relative to the casing, brackets forming a part of the manifold and having radially extending pins thereon constituting the manifold attached element of the interfitting elements, and cooperating bosses in the casing having radially extending bores constituting the casing attached elements to receive the pins.

6. In a fuel supply system for a gas turbine power plant having a casing, the system including a fuel manifold in the form of a ring positioned within said casing, and interfitting elements on the casing and manifold at angularly spaced points around the manifold one of said interfitting elements being radially slidable relative to the other to support the manifold concentrically of the casing, leaving the manifold free to expand and contract relative to the casing, brackets forming a part of the manifold and having radially extending pins thereon constituting the manifold attached element of the interfitting elements, and cooperating bosses in the casing having radially extending bores constituting the casing attached elements to receive the pins, said casing being segmental to provide for access to said manifold.

7. In a fuel supply system for a gas turbine power plant having a casing, the system including a fuel manifold in the form of a ring positioned within said casing, and interfitting elements attached to the casing and manifold at angularly spaced points around the manifold one of said interfitting elements being radially slidable relative to the other to support the manifold concentrically of the casing, leaving the manifold free to expand and contract relative to the casing, brackets forming a part of the manifold and having radially extending pins thereon constituting the manifold attached element of the interfitting elements, and cooperating bosses in the casing having radially extending bores constituting the casing attached elements to receive the pins, said casing being segmental to provide for access to said manifold, each segment having one of the bosses therein.

8. In a fuel supply system for a gas turbine power plant having a casing, and a shield within and spaced from the casing to define the outer wall of a duct, the system including a fuel manifold in the form of a ring positioned within said casing in the space between the casing and shield, said manifold including angularly spaced brackets supported by the casing, conduits extending between and separable from said brackets, and nozzles located radially inwardly of the shield and carried by said conduits, said conduits and nozzles being supported by said brackets.

9. In a fuel supply system for a gas turbine power plant having a casing and a gas path within the casing, the system including a fuel manifold in the form of a ring positioned within said casing, said manifold including: angularly spaced brackets, means for supporting each of said brackets for radial sliding movement relative to the casing, conduits located within said casing and extending circumferentially between and separable from said brackets, and nozzles carried by said conduits and located in the gas path.

10. In a fuel supply system for a gas turbine power plant having a casing, the system including a fuel manifold in the form of a ring positioned within said casing, said manifold including: angularly spaced brackets, conduits extending circumferentially between and separable from said brackets, a set of nozzles forming an assembly carried by the conduits that extend between adjacent brackets, and means for removably securing said assembly and the conduits to said brackets.

11. In a gas turbine power plant, a casing, an annular path for gas within the casing, including a wall within and spaced from the casing to define an annular chamber, a series of angularly spaced nozzle assemblies positioned in the gas path, and a fuel manifold in the form of a ring in said chamber and supporting said nozzle assemblies, said fuel manifold including: angularly spaced brackets located in the chamber and having transversely extending fuel passages, and conduits extending between adjacent brackets, the conduits between adjacent brackets supporting each of the nozzle assemblies, one of said brackets having fuel inlet means accessible externally of the casing.

12. In a gas turbine power plant, a casing, an annular path for gas within the casing, including a sectional outer wall located within and spaced from the casing to define an annular chamber between said wall and casing, and a fuel manifold in the form of a ring in said chamber, said fuel manifold including: a series of angularly spaced nozzle assemblies positioned in the gas path, angularly spaced brackets in the chamber, and conduit means in said chamber extending between adjacent brackets, the conduit means between each two adjacent brackets supporting a nozzle assembly, said conduits also supporting a section of the outer wall of the gas path.

13. In a gas turbine power plant, a casing, an annular path for gas within the casing, including an outer wall located within and spaced from the casing to define an annular chamber, and a fuel manifold in the form of a ring in said chamber, said fuel manifold including: a series of angularly spaced nozzle assemblies positioned in the gas path, angularly spaced brackets located in the chamber, and conduit means located in said chamber and extending between adjacent brackets, said conduit means having a separable connection with said brackets, the conduit means extending between each two adjacent brackets supporting a nozzle assembly.

14. In a gas turbine power plant, a casing, an annular path for gas within the casing, including an outer wall spaced from the casing to define an annular chamber, and a fuel manifold in the form of a ring in said chamber, said fuel manifold including: a series of angularly spaced nozzle assemblies positioned in the gas path, angularly spaced brackets in the chamber, and conduit means in said chamber extending between adjacent brackets, the conduit means between each two adjacent brackets supporting a nozzle assembly, said conduit means having mounting plates thereon at opposite ends engageable with the brackets, and releasable fastening means securing said plates to the brackets.

15. In a gas turbine power plant, a casing, an annular path for gas within the casing, including a segmental outer wall spaced in part from the casing to define an annular chamber, and a fuel manifold in the form of a ring in said chamber, said fuel manifold including a series of angularly spaced nozzle assemblies positioned in the gas path, angularly spaced brackets in the chamber, and conduit means extending between adjacent brackets, the conduit means between each two adjacent brackets supporting a nozzle assembly, said conduit means having mounting plates thereon at opposite ends engageable with the brackets, and releasable fastening means securing said plates to the brackets, said mounting plates also supporting a segment of the outer wall between adjacent brackets.

16. In a gas turbine power plant, a casing, an annular path for gas within the casing, including an outer wall spaced in part from the casing to define an annular chamber, and a fuel manifold in the form of a ring in said chamber, said fuel manifold including: a series of angularly spaced nozzle assemblies positioned in the gas path, angularly spaced brackets in the chamber, certain of said brackets having supporting means thereon engaging with and radially slidable relative to the casing to provide for relative expansion between the manifold ring and the casing, conduit means extending between adjacent brackets and connected to and removable therefrom, the conduit means between each two adjacent brackets supporting a nozzle assembly.

17. In a gas turbine power plant, a casing, inner and outer walls defining an annular gas path within said casing for the flow of gas through said power plant, the outer wall of said gas path being within and spaced in part from said casing to form an annular chamber therebetween, a number of angularly spaced flame tubes in said gas path, and a number of fuel nozzles delivering fuel to the upstream end of each flame tube, in combination with an annular fuel manifold extending around the outer wall and located in said chamber, said manifold including: angularly spaced brackets having fuel passages therein, conduits extending between adjacent brackets for the flow of fuel therebetween, a nozzle supporting bracket mounted on each conduit and supporting the set of nozzles for the associated flame tube, and mounting plates on the ends of the conduits for releasably attaching them to the angularly-spaced brackets whereby the fuel nozzle assembly for any flame tube, together with the supporting bracket and conduit, may be removed as a unit from the power plant.

18. In a gas turbine power plant, a casing, an annular gas path within said casing for the flow of gas through said power plant, the outer wall of said gas path being spaced in part from said casing to form an annular chamber therebetween, a number of angularly spaced flame tubes in said gas path, and a number of fuel nozzles delivering fuel to the upstream end of each flame tube, in combination with an annular fuel manifold extending around the outer wall and located in said chamber, said manifold including: angularly spaced brackets having fuel passages therein, conduits extending between adjacent brackets for the flow of fuel therebetween, a nozzle supporting bracket mounted on each conduit and supporting the set of nozzles for the associated flame tube, and mounting plates on the ends of the conduits for releasably attaching them to the angularly-spaced brackets whereby the fuel nozzle assembly for any flame tube, together with the supporting bracket and conduit may be removed as a unit from the power plant, said casing being segmental with each segment being separately removable from the power plant for access to the fuel manifold.

19. In a gas turbine power plant, a casing, an annular gas path within said casing for the flow of gas through said power plant, the outer wall of said gas path being spaced in part from said casing to form an annular chamber therebetween, a number of angularly spaced flame tubes in said gas path, and a number of fuel nozzles delivering fuel to the upstream end of each flame tube, in combination with an annular fuel manifold extending around the outer wall and located in said chamber, said manifold including: angularly spaced brackets having fuel passages therein, conduits extending between adjacent brackets for the flow of fuel therebetween, a nozzle supporting bracket mounted on each conduit and supporting the set of nozzles for the associated flame tube, and mounting plates on the ends of the conduits for releasably attaching them to the angularly-spaced brackets whereby the fuel nozzle assembly for any flame tube, together with the supporting bracket and conduit, may be removed as a unit from the power plant, said casing being segmental with each segment being separately removable from the power plant for access to the fuel manifold, the outer wall of the gas path also being segmental with the nozzle supporting brackets supporting the segments of the outer wall between adjacent angularly-spaced brackets.

References Cited in the file of this patent

UNITED STATES PATENTS

| Number | Name | Date |
|---|---|---|
| 2,273,406 | Lasley | Feb. 17, 1942 |
| 2,404,334 | Whittle | July 16, 1946 |
| 2,414,788 | Altorfer et al. | Jan. 28, 1947 |
| 2,417,445 | Pinkel | Mar. 18, 1947 |
| 2,432,359 | Streid | Dec. 9, 1947 |
| 2,445,114 | Halford | July 13, 1948 |
| 2,470,126 | Altorfer | May 17, 1949 |
| 2,479,573 | Howard | Aug. 23, 1949 |
| 2,526,410 | Price | Oct. 17, 1950 |
| 2,616,258 | Mock | Nov. 4, 1952 |